United States Patent
Sugawara

(10) Patent No.: US 10,827,084 B2
(45) Date of Patent: Nov. 3, 2020

(54) IMAGE FORMING APPARATUS INCLUDING AN OPERATION PANEL AND A LINKAGE DEFINING A MOVABLE RANGE OF THE OPERATION PANEL

(71) Applicant: Shun Sugawara, Iwate (JP)

(72) Inventor: Shun Sugawara, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 15/630,176

(22) Filed: Jun. 22, 2017

(65) Prior Publication Data

US 2018/0027134 A1 Jan. 25, 2018

(30) Foreign Application Priority Data

Jul. 20, 2016 (JP) ................................. 2016-142320

(51) Int. Cl.
*H04N 1/00* (2006.01)
*G03G 15/00* (2006.01)

(52) U.S. Cl.
CPC ..... *H04N 1/00411* (2013.01); *G03G 15/5016* (2013.01); *H04N 1/00392* (2013.01);
(Continued)

(58) Field of Classification Search
CPC ........................ H04N 1/00559; G03G 15/5016
See application file for complete search history.

(56) References Cited

U.S. PATENT DOCUMENTS 9,388,617 B2 * 7/2016 Onda ..................... G06F 1/1679
2008/0062444 A1 * 3/2008 Sugawara .......... H04N 1/00496
358/1.9
(Continued)

FOREIGN PATENT DOCUMENTS

JP 2003-231328 A 8/2003
JP 2004-038094 A 2/2004
(Continued)

OTHER PUBLICATIONS

Extended European Search Report dated Dec. 6, 2017 issued in corresponding European Application No. 17177463.1.
(Continued)

*Primary Examiner* — Benjamin O Dulaney
(74) *Attorney, Agent, or Firm* — Harness, Dickey & Pierce, P.L.C.

(57) ABSTRACT

An image forming apparatus includes an operation display movably mounted on a mount face and a linkage defining a movement range of the operation display. The linkage includes a first arm coupling a part of the mount face with a part of the operation display and a second arm coupling another part of the mount face with another part of the operation display. The operation display moves in the movement range in which the operation display does not enter the opening, does not protrude outward beyond the mount face when the first arm and the second arm support the operation display perpendicularly to an installation face of the image forming apparatus where the image forming apparatus is placed, and does not protrude upward beyond a scanner when the first arm and the second arm support the operation display parallel to the installation face of the image forming apparatus.

12 Claims, 15 Drawing Sheets

(52) U.S. Cl.
CPC . *H04N 1/00559* (2013.01); *H04N 2201/0089* (2013.01); *H04N 2201/0094* (2013.01)

(56) References Cited

U.S. PATENT DOCUMENTS

| | | | |
|---|---|---|---|
| 2009/0168112 A1* | 7/2009 | Muraki | H04N 1/00496 358/296 |
| 2010/0091315 A1* | 4/2010 | Shiraki | H04N 1/00384 358/1.13 |
| 2012/0006767 A1* | 1/2012 | Bennett | F16M 11/10 211/26 |
| 2014/0252181 A1* | 9/2014 | Mau | F16M 11/2021 248/125.1 |
| 2014/0304948 A1 | 10/2014 | Onda | |
| 2015/0307140 A1* | 10/2015 | Scott | B62D 33/10 296/190.07 |
| 2016/0051067 A1* | 2/2016 | Law | A47F 9/046 361/679.22 |
| 2017/0061730 A1* | 3/2017 | Ho | G07F 17/3211 |

FOREIGN PATENT DOCUMENTS

| | | | |
|---|---|---|---|
| JP | 2009-098260 A | | 5/2009 |
| JP | 2009098260 A | * | 5/2009 |
| JP | -2009098260 A | * | 5/2009 |
| JP | 2009098260 A | * | 5/2009 |
| JP | 2009-139880 A | | 6/2009 |
| JP | 2009157165 A | | 7/2009 |
| JP | 2010016495 A | | 1/2010 |
| JP | 2010-091989 | | 4/2010 |
| JP | 2010-256570 | | 11/2010 |
| JP | 2014206180 A | | 10/2014 |

OTHER PUBLICATIONS

Japanese Office Action dated Jan. 28, 2020 for Japanese Patent Application No. 2016-142320.

* cited by examiner

FIG. 12

| INTERIOR ANGLE | TILT ANGLE | | | | | | | | | |
|---|---|---|---|---|---|---|---|---|---|---|
| | 90 | 80 | 70 | 60 | 50 | 40 | 30 | 20 | 10 | 0 |
| Arm1OP | 23.45 | 38.04 | 57.59 | 81.02 | 104.65 | 125.93 | 144.58 | 161.11 | 175.72 | 189.04 |
| Arm1BS | 140.28 | 135.58 | 125.95 | 112.61 | 99.03 | 87.65 | 78.86 | 72.32 | 67.72 | 64.57 |
| Arm2OP | 169.93 | 153.76 | 133.96 | 111.83 | 90.54 | 72.19 | 56.75 | 43.6 | 32.38 | 22.42 |
| Arm2BS | 26.34 | 32.62 | 42.48 | 54.54 | 65.78 | 74.24 | 79.81 | 82.97 | 84.19 | 83.96 |

FIG. 14

| INTERIOR ANGLE | CHANGE IN TILT ANGLE | | | | | | | | |
|---|---|---|---|---|---|---|---|---|---|
| | 90-80 | 80-70 | 70-60 | 60-50 | 50-40 | 40-30 | 30-20 | 20-10 | 10-0 |
| Arm1OP | 14.59 | 19.55 | 23.43 | 23.63 | 21.28 | 18.65 | 16.53 | 14.61 | 13.32 |
| Arm1BS | 4.7 | 9.63 | 13.34 | 13.58 | 11.38 | 8.79 | 6.54 | 4.6 | 3.15 |
| Arm2OP | 16.17 | 19.8 | 22.13 | 21.29 | 18.35 | 15.44 | 13.15 | 11.22 | 9.96 |
| Arm2BS | 6.28 | 9.86 | 12.06 | 11.24 | 8.46 | 5.57 | 3.16 | 1.22 | 0.23 |
| TOTAL | 41.74 | 58.84 | 70.96 | 69.74 | 59.47 | 48.45 | 39.38 | 31.65 | 26.66 |

IMAGE FORMING APPARATUS INCLUDING AN OPERATION PANEL AND A LINKAGE DEFINING A MOVABLE RANGE OF THE OPERATION PANEL

CROSS-REFERENCE TO RELATED APPLICATION

This patent application is based on and claims priority pursuant to 35 U.S.C. § 119 to Japanese Patent Application No. 2016-142320, filed on Jul. 20, 2016, in the Japanese Patent Office, the entire disclosure of which is hereby incorporated by reference herein.

BACKGROUND

Technical Field

Embodiments generally relate to an image forming apparatus, and more particularly, to an image forming apparatus for forming an image on a recording medium.

Background Art

Related-art image forming apparatuses, such as copiers, facsimile machines, printers, and multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such image forming apparatus includes a print device, a scanner disposed above the print device, and an internal output tray interposed between the print device and the scanner. In order to allow a user to pick up a sheet ejected onto the internal output tray, a control panel is movably mounted on a body of the image forming apparatus.

SUMMARY

This specification describes below an improved image forming apparatus. In one embodiment, the image forming apparatus includes a body including a mount face. An opening is disposed inside the body. A recording medium is ejected into the opening. A scanner is disposed above the opening. An operation display is movably mounted on the mount face of the body. A linkage defines a movement range of the operation display and includes a first arm coupling a part of the mount face with a part of the operation display, a second arm coupling another part of the mount face with another part of the operation display, a first rotation shaft mounted on the first arm and coupled with the body, a second rotation shaft mounted on the second arm and coupled with the body, a third rotation shaft mounted on the first arm and coupled with the operation display, and a fourth rotation shaft mounted on the second arm and coupled with the operation display. The operation display moves in the movement range in which the operation display does not enter the opening, does not protrude outward beyond the mount face of the body when the first arm and the second arm support the operation display perpendicularly to an installation face of the image forming apparatus where the image forming apparatus is placed, and does not protrude upward beyond the scanner when the first arm and the second arm support the operation display parallel to the installation face of the image forming apparatus.

This specification further describes an improved image forming apparatus. In one embodiment, the image forming apparatus includes a body including a mount face. An internal ejection portion is disposed inside the body and defines an opening into which a recording medium is ejected. A scanner is disposed above the internal ejection portion. An operation display is movably mounted on the mount face of the body. A linkage defines a movement range of the operation display and includes a first arm coupling a part of the mount face with a part of the operation display, a second arm coupling another part of the mount face with another part of the operation display, a first rotation shaft mounted on the first arm and coupled with the mount face of the body, a second rotation shaft mounted on the second arm and coupled with the mount face of the body, a third rotation shaft mounted on the first arm and coupled with the operation display, and a fourth rotation shaft mounted on the second arm and coupled with the operation display. The operation display moves in the movement range in which the operation display does not enter the opening, does not protrude outward beyond the mount face of the body, and does not protrude upward beyond the scanner.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 12 is a lookup table illustrating a relation between a tilt angle of the control panel and an interior angle formed by the rotation shafts depicted in FIG. 11;

FIG. 14 is a lookup table illustrating a relation between change in the tilt angle of the control panel and the interior angle formed by the rotation shafts depicted in FIG. 11;

Figure 1:
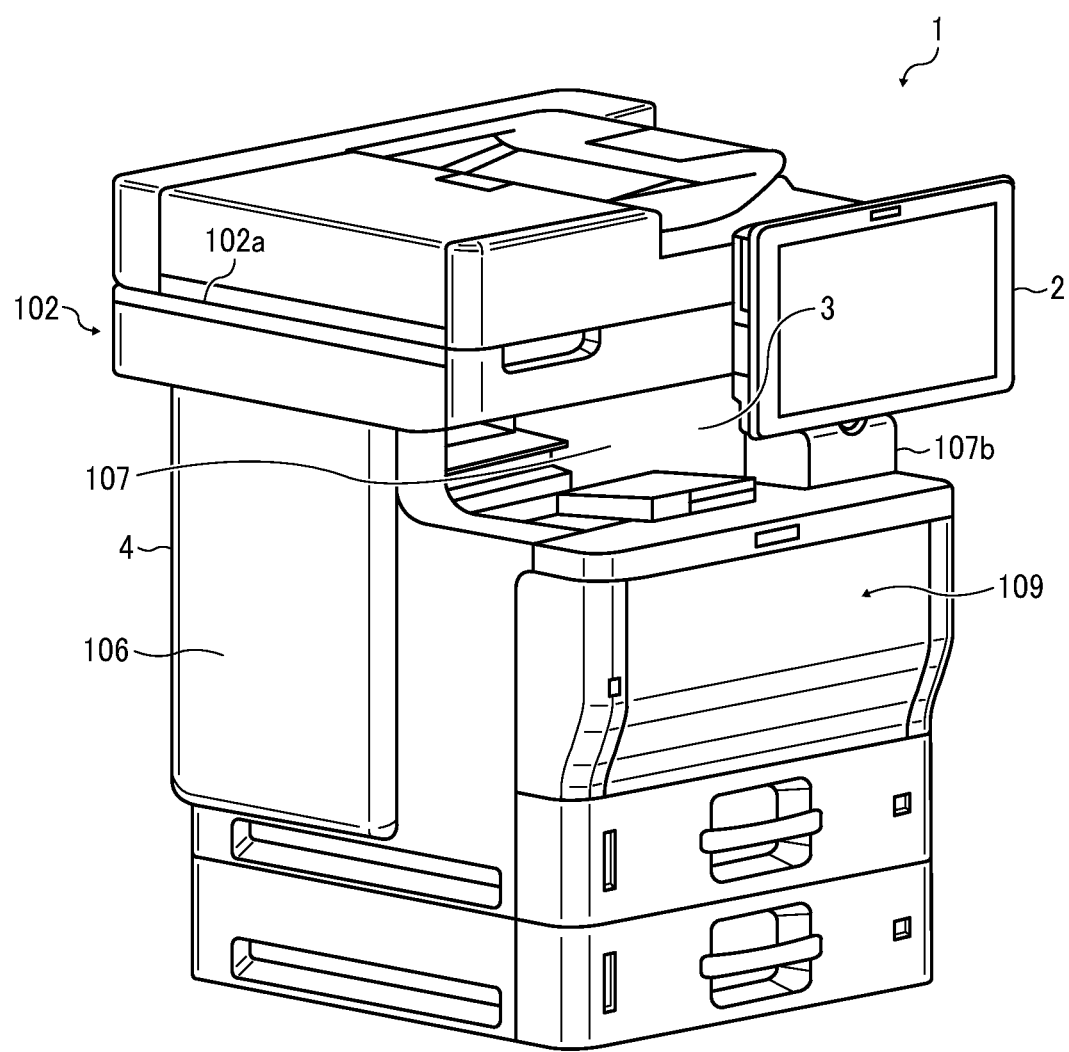
FIG. 1 is a perspective view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF THE DISCLOSURE

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views, particularly to FIG. 1, an image forming apparatus 1 according to an embodiment is explained.

The image forming apparatus 1 may be a copier, a facsimile machine, a printer, a multifunction peripheral or a multifunction printer (MFP) having at least one of copying, printing, scanning, facsimile, and plotter functions, or the like. According to this embodiment, the image forming apparatus 1 is a color copier that forms a color toner image on a recording medium by electrophotography. Alternatively, the image forming apparatus 1 may be a monochrome copier that forms a monochrome toner image on a recording medium.

FIG. 1 is a perspective view of the image forming apparatus 1.

The image forming apparatus 1 is an MFP incorporating a control panel 2 serving as a user interface with which a user inputs an instruction.

A description is provided of a construction of the image forming apparatus 1.

The image forming apparatus 1 is the MFP having an imaging function, an image forming function, a communicating function, and the like, thus used as a printer, a facsimile machine, a scanner, and a copier. The control panel 2 is a terminal with which the user inputs an instruction. The control panel 2 sends commands to perform a print job and make settings for the print job to various components of the image forming apparatus 1 according to the instruction input by the user. The control panel 2 is installed with a program and the like to send the commands to the various components of the image forming apparatus 1.

The control panel 2 serves as an operation display of the MFP, which includes a touch panel and a keyboard. The touch panel displays an operation status of the image forming apparatus 1. The user inputs an instruction with the touch panel and the keyboard. According to this embodiment, the control panel 2 has a vertical length of about 150 mm and a horizontal length of about 250 mm. Alternatively, the control panel 2 may have other sizes.

As illustrated in FIG. 1, the image forming apparatus 1 includes a scanner unit 102, a print engine 106, and an output tray 107. The scanner unit 102 serves as an image scanner situated in an upper portion of the image forming apparatus 1. The output tray 107 is interposed between the scanner unit 102 and the print engine 106 and receives a print sheet ejected onto the output tray 107. The output tray 107 serves as an internal tray or an internal ejection portion that ejects the sheet serving as a recording medium into an opening 3 being disposed inside a body 4 of the image forming apparatus 1. FIG. 1 illustrates the output tray 107 where the sheet is ejected from a rear to a front of the output tray 107, that is, from an inside toward an outside of the body 4 of the image forming apparatus 1. Alternatively, the sheet may be ejected onto the output tray 107 through a joint 107b that couples the scanner unit 102 with the print engine 106.

Figure 2:
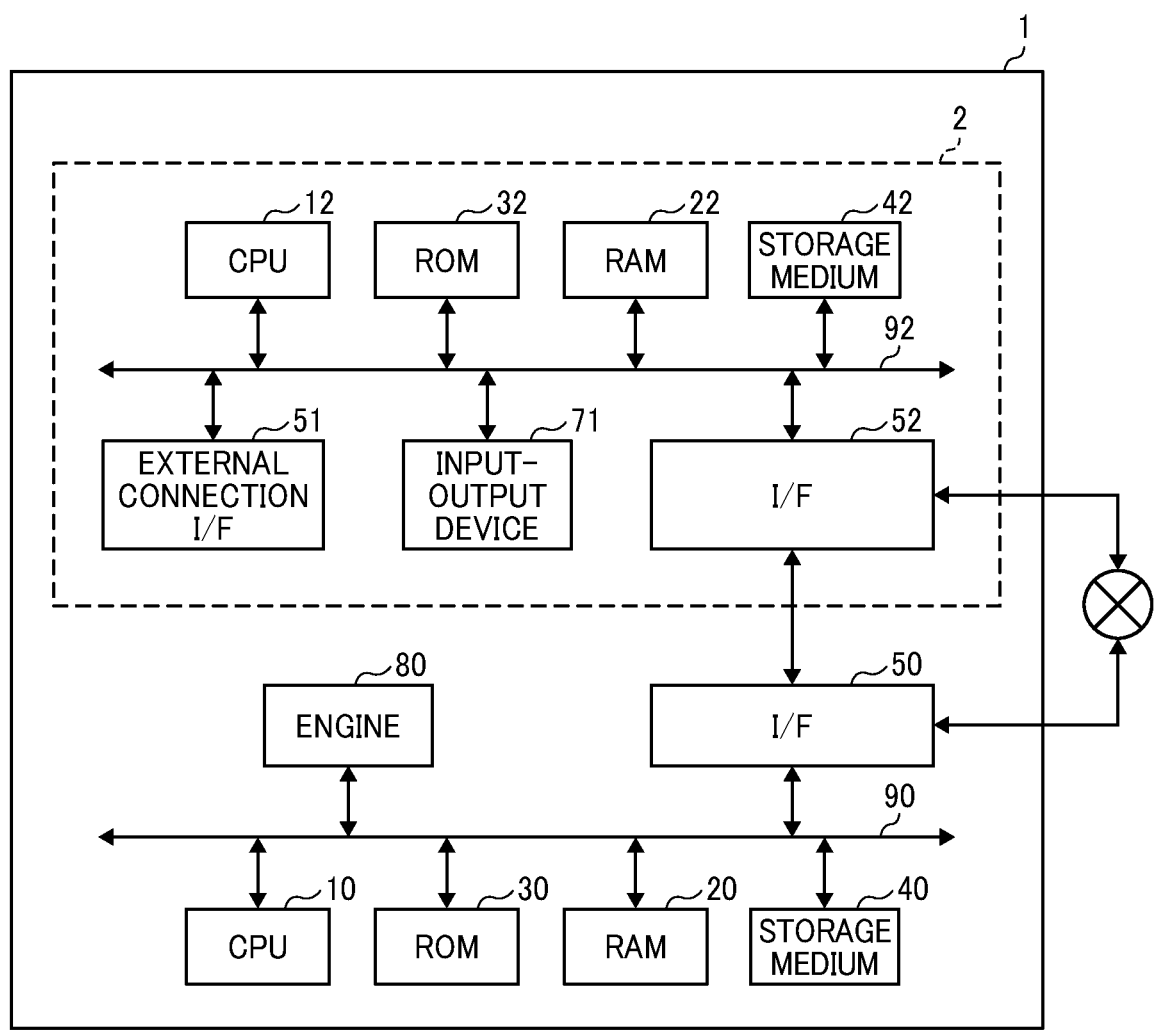
FIG. 2 is a block diagram of a hardware configuration of the image forming apparatus depicted in FIG. 1.

Referring to FIG. 2, a description is provided of a hardware configuration of the image forming apparatus 1 and the control panel 2.

FIG. 2 is a block diagram of the hardware configuration of the image forming apparatus 1 and the control panel 2. As illustrated in FIG. 2, the control panel 2 is used to achieve an input function and an output function of the image forming apparatus 1. FIG. 2 illustrates a configuration in which the control panel 2 is attached to the body 4 of the image forming apparatus 1.

The image forming apparatus 1 includes a configuration similar to a configuration of an information processing apparatus such as a general personal computer (PC) and a server. The image forming apparatus 1 includes a central processing unit (CPU) 10, a random access memory (RAM) 20, a read only memory (ROM) 30, a storage medium 40 such as a hard disk drive (HDD), and an interface (I/F) 50 that are connected through a bus 90. The image forming apparatus 1 further includes an engine 80 that activates a scanner, a printer, and the like.

The CPU 10 is a calculator that controls the entire operation of the image forming apparatus 1. The RAM 20 is a volatile storage medium that reads and writes information at high speed. The RAM 20 is used as a work area where the CPU 10 processes information. The ROM 30 is a non-volatile storage medium for reading only and stores a program such as firmware. The storage medium 40 is a non-volatile storage medium that reads and writes information and stores an operating system (OS), various control programs, an application program (hereinafter referred to as an application), and the like.

The I/F 50 connects the bus 90 to various hardware, a network, and the like for control. The control panel 2 connected to the components of the image forming apparatus 1 serves as the operation display which includes the touch panel and hard keys.

Figure 3:
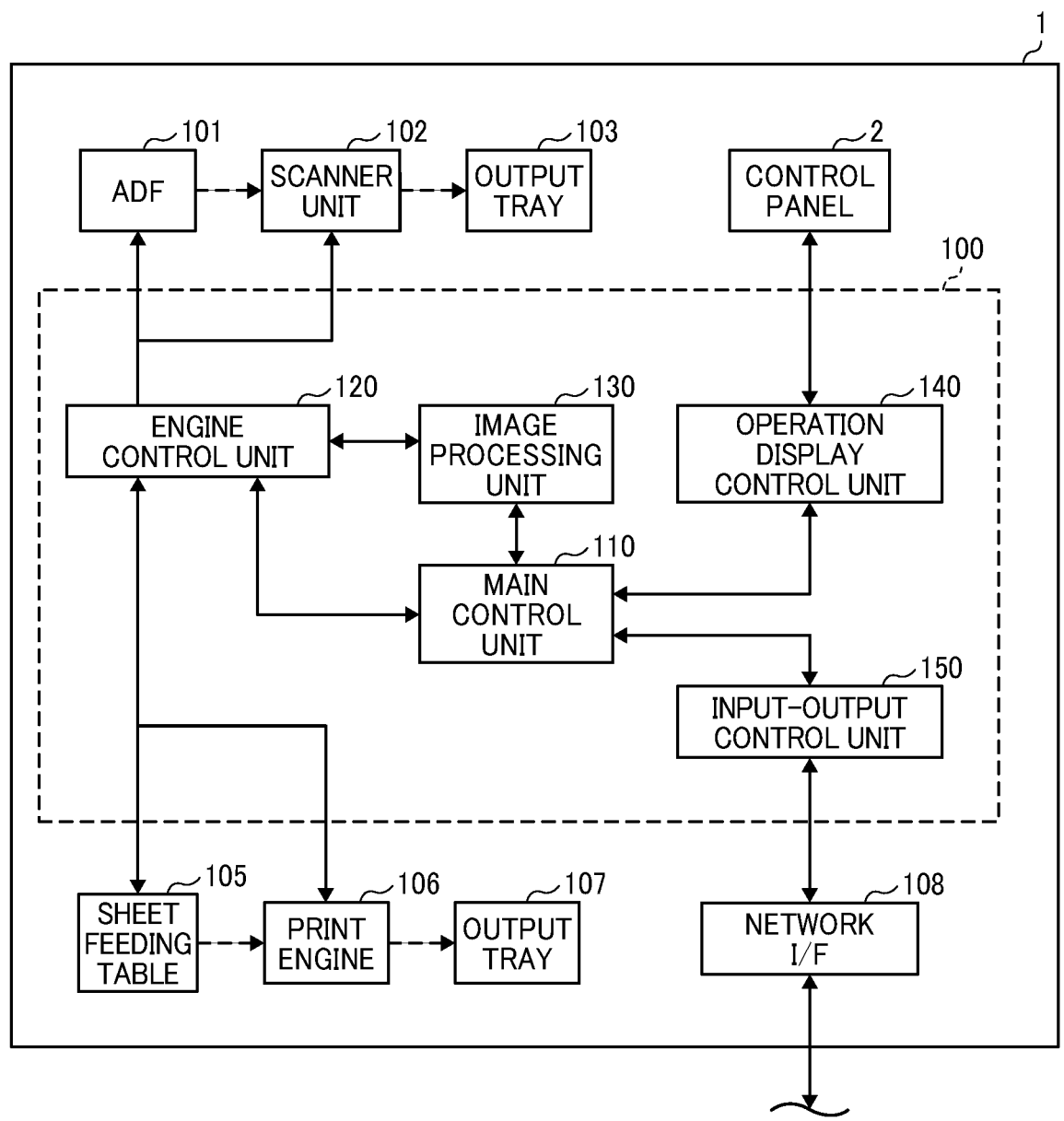
FIG. 3 is a block diagram of a functional configuration of the image forming apparatus depicted in FIG. 1.

With the hardware configuration described above, the CPU 10 performs calculation according to the program stored in the ROM 30 or a program read out from the storage medium 40 or a storage medium such as an optical disc to the RAM 20, thus attaining functional components inside a controller 100 illustrated in FIG. 3. FIG. 3 is a block diagram of a functional configuration of the image forming apparatus 1. The functional components inside the controller 100 configured as described above are combined with the hardware to produce a functional block that attains the functions of the image forming apparatus 1.

As illustrated in FIG. 2, the control panel 2 includes a CPU 12, a RAM 22, a ROM 32, a storage medium 42 such as a flash memory, and an interface (I/F) 52 that are connected through a bus 92. The control panel 2 is connected to the components of the image forming apparatus 1 and the network through the I/F 52 to send and receive information. An input-output device 71 is one example of an operation receiver or an instruction receiver and includes a touch screen and soft keys as graphic information such as icons displayed on the touch screen. An external connection interface (I/F) 51 is an interface connected to a peripheral device such as an integrated circuit (IC) card reader.

The CPU 12 is a calculator that controls the entire operation of the control panel 2. The RAM 22 is a volatile storage medium that reads and writes information at high speed. The RAM 22 is used as a work area where the CPU 12 processes information. The ROM 32 is a non-volatile storage medium for reading only and stores a program such as firmware. The storage medium 42 is a non-volatile storage medium that reads and writes information and stores an operating system (OS), various control programs, an application program (hereinafter referred to as an application), and the like. For example, the user inputs an instruction to perform one or more of the functions installed in the image forming apparatus 1 such as printing and scanning and an instruction to set a print condition for each item by using the application with the control panel 2.

The I/F 52 connects the bus 92 to various hardware, a network, and the like for control. As described above, the input-output device 71 is a user interface with which the user checks a status of the image forming apparatus 1, which is received through the I/F 52 or the user inputs information to the image forming apparatus 1. According to this embodiment, the input-output device 71 includes the touch panel. As the principle of operation, the input-output device 71 employs a resistive film method, a surface acoustic wave method, an electrostatic capacity method, or the like.

With the hardware configuration described above, the CPU 12 performs calculation according to a program stored in the ROM 32 or a program read out from the storage medium 42 or a storage medium such as an optical disc to the RAM 22, thus attaining functional components inside the controller 100 illustrated in FIG. 3. The functional components inside the controller 100 configured as described above are combined with the hardware to produce a functional block that attains the functions of the image forming apparatus 1.

Referring to FIG. 3, a description is provided of a functional configuration of the image forming apparatus 1.

FIG. 3 is a block diagram of the functional configuration of the image forming apparatus 1. As illustrated in FIG. 3, the image forming apparatus 1 includes the controller 100, an auto document feeder (ADF) 101, the scanner unit 102, an output tray 103, a sheet feeding table 105, the print engine 106, the output tray 107, and a network interface (I/F) 108. The following describes one example according to this embodiment, in which the control panel 2 is attached to the body 4 of the image forming apparatus 1 and the controller 100 performs processes based on information input by the user with the control panel 2.

As illustrated in FIG. 3, the controller 100 includes a main control unit 110, an engine control unit 120, an image processing unit 130, an operation display control unit 140, and an input-output control unit 150. The image forming apparatus 1 according to this embodiment is an MFP incorporating the scanner unit 102 and the print engine 106. FIG. 3 illustrates electrical connection in solid arrows and conveyance of the sheet in dotted arrows.

The control panel 2 serves as a display that visually displays the status of the image forming apparatus 1. The control panel 2 also serves as an input device as a touch panel with which the user controls the image forming apparatus 1 directly or inputs information or an instruction to the image forming apparatus 1. That is, the control panel 2 has a function to display an image or an icon used to receive the information or the instruction from the user.

The network I/F 108 is an interface through which the image forming apparatus 1 communicates with an external device through the network. Ethernet®, Universal Serial Bus (USB) interface, or the like is used as the network I/F 108. The network I/F 108 is capable of communication with TCP/IP protocol. When the image forming apparatus 1 serves as a facsimile machine, the network I/F 108 is also used as an interface through which the image forming apparatus 1 performs communication by facsimile. Hence, the network I/F 108 is also connected to a telephone line. The network I/F 108 is achieved by the I/F 50 depicted in FIG. 2.

The controller 100 is constructed of combination of software and hardware. For example, the controller 100 is constructed of a software controller and hardware such as an integrated circuit. The software controller is attained by loading of a program stored in the ROM 30, a non-volatile memory, the storage medium 40, or a non-volatile storage medium such as an optical disc to a volatile memory (hereinafter referred to as a memory) such as the RAM 20 and calculation by the CPU 10 according to the program. The controller 100 controls the entire image forming apparatus 1.

The main control unit 110 controls each component of the controller 100 and issues a command to each component of the controller 100. The engine control unit 120 serves as a driver that controls or drives the print engine 106, the scanner unit 102, and the like. The image processing unit 130 produces drawing data based on image data used to form a toner image on a sheet under control by the main control unit 110. The drawing data is used for the print engine 106 serving as an image forming device to draw an image to be formed into the toner image.

The image processing unit 130 processes imaging data input by the scanner unit 102 to produce image data. The image data is stored in a storage area of the image forming apparatus 1 as a result of scanning or sent to other data processing terminal or a storage device through the network I/F 108.

The operation display control unit 140 requests the control panel 2 to display information or notifies the main control unit 110 of information input through the control panel 2. The input-output control unit 150 inputs information input through the network I/F 108 to the main control unit 110. The main control unit 110 controls the input-output control unit 150 and accesses the external device connected to the network through the network I/F 108 and the network.

When the image forming apparatus 1 serves as a printer, the input-output control unit 150 receives a print job through the network I/F 108. The input-output control unit 150 forwards the received print job to the main control unit 110. When the main control unit 110 receives the print job, the main control unit 110 controls the image processing unit 130 to produce drawing data based on document data or image data of the print job.

After the image processing unit 130 produces the drawing data, the engine control unit 120 controls the print engine 106 to form a toner image on a sheet conveyed from the sheet feeding table 105 according to the drawing data produced as described above. Thus, the image processing unit 130, the engine control unit 120, and the print engine 106 work as an image forming-output portion. For example, the print engine 106 is an image forming mechanism employing an inkjet printing system, an electrophotographic system, or the like. The sheet bearing the toner image formed by the print engine 106 is ejected onto the output tray 107.

When the image forming apparatus 1 serves as a scanner, the operation display control unit 140 or the input-output control unit 150 forwards a scanning signal to the main control unit 110 according to a scanning instruction input by the user with the control panel 2 or by other terminal through the network I/F 108. The main control unit 110 controls the engine control unit 120 based on the received scanning signal.

The engine control unit 120 drives the ADF 101 to convey an original bearing an image, which is placed on the ADF 101, to the scanner unit 102. The engine control unit 120 drives the scanner unit 102 to scan the image on the original conveyed from the ADF 101. If the original is not placed on the ADF 101 but is placed on the scanner unit 102 directly, the scanner unit 102 scans the image on the original placed thereon under control by the engine control unit 120. Thus, the scanner unit 102 works as a scanner and the engine control unit 120 works as a scanner controller.

While scanning, an imaging element, such as a contact image sensor (CIS) and a charge-coupled device (CCD), of the scanner unit 102 optically scans the image on the original to produce scan data based on optical data. The engine control unit 120 forwards the scan data produced by the scanner unit 102 to the image processing unit 130. The image processing unit 130 produces image data based on the scan data received from the engine control unit 120 under control by the main control unit 110.

The main control unit 110 obtains the image data produced by the image processing unit 130 and stores the image data in a storage medium installed in the image forming apparatus 1 such as the storage medium 40. Thus, the scanner unit 102, the engine control unit 120, and the image processing unit 130 work together as an image input portion. The image data produced by the image processing unit 130 is stored by the storage medium 40 or the like without change according to the instruction input by the user or sent to the external device through the input-output control unit 150 and the network I/F 108.

When the image forming apparatus 1 serves as a copier, the image processing unit 130 produces drawing data based on scan data received from the scanner unit 102 or image data produced by the image processing unit 130. Like when the image forming apparatus 1 serves as the printer, the engine control unit 120 drives the print engine 106 according to the drawing data. If the drawing data and the scan data share an identical data format, the scan data may be used as the drawing data without conversion.

A description is provided of a construction of a comparative image forming apparatus. The comparative image forming apparatus includes a print device, a scanner disposed above the print device, and an internal output tray interposed between the print device and the scanner. In order to allow a user to pick up a sheet ejected onto the internal output tray, a control panel is movably mounted on a body of the comparative image forming apparatus.

The control panel is supported by a pivot arm including a plurality of hinge shafts. A driver that rotates the hinge shafts and a motor that generates a driving force to be transmitted to the driver are disposed inside the pivot arm collectively. However, in order to prevent the hinge shafts from moving accidentally, a mechanism that interlocks the hinge shafts is needed, upsizing the pivot arm accommodating the driver and the motor.

Figure 4:
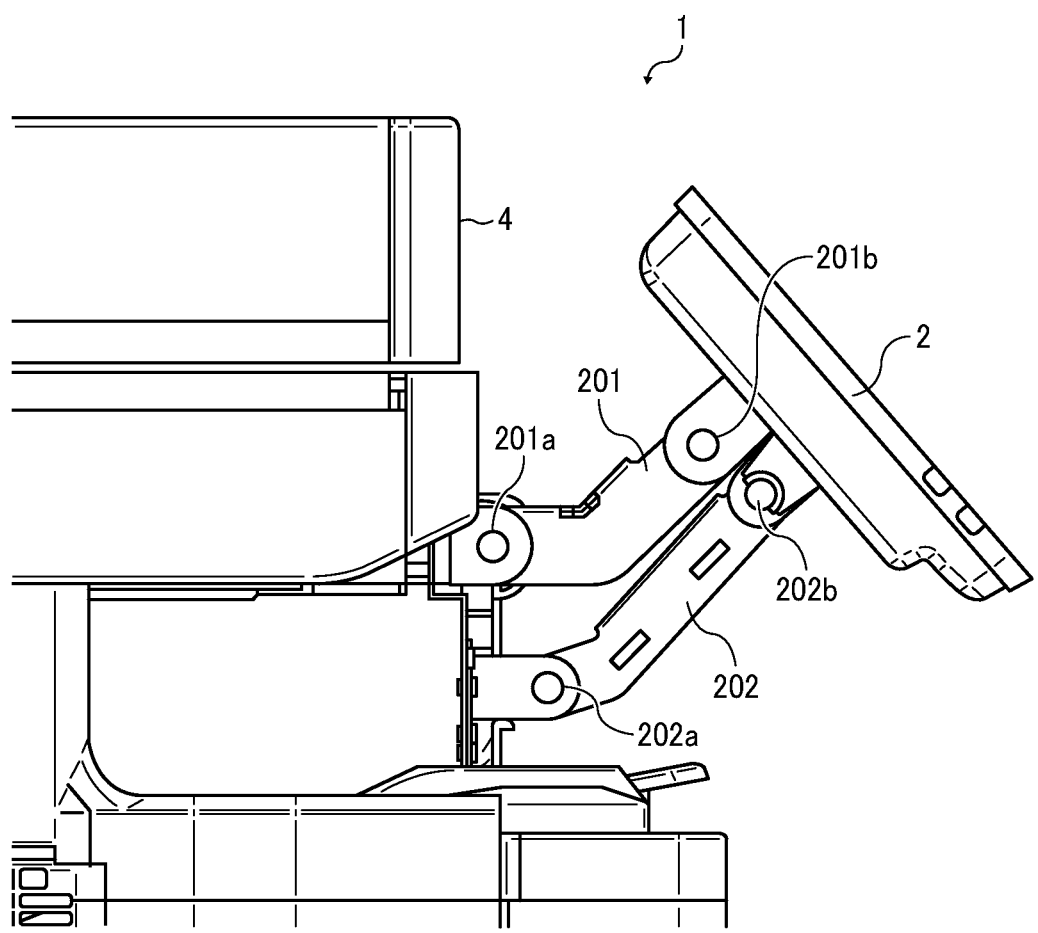
FIG. 4 is a partial side view of the image forming apparatus depicted in FIG. 1, illustrating a control panel and arms incorporating therein.
Figure 5:
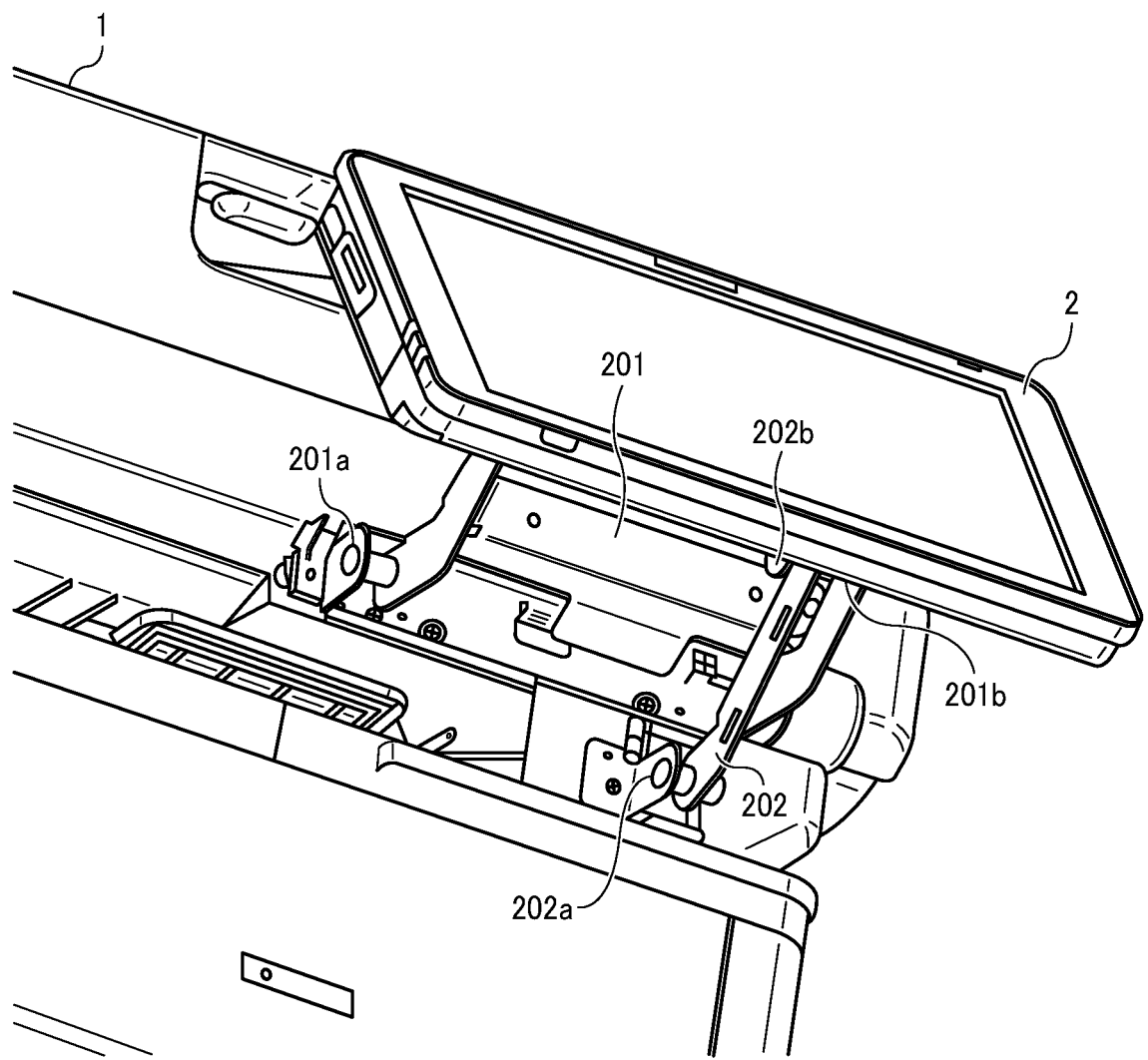
FIG. 5 is a perspective view of the control panel and the arms depicted in FIG. 4.

Referring to FIGS. 4 and 5, a description is provided of a construction of arms 201 and 202 of the image forming apparatus 1.

The arms 201 and 202 couple the control panel 2 with the body 4 of the image forming apparatus 1. Each of the arms 201 and 202 is made of metal. Optionally, each of the arms 201 and 202 may be coated with resin. The arms 201 and 202 serve as a first arm and a second arm that support the control panel 2. FIG. 4 is a partial side view of the image forming apparatus 1, illustrating the arms 201 and 202. FIG. 5 is a perspective view of the control panel 2 and the arms 201 and 202. As illustrated in FIG. 4, the arms 201 and 202 are mounted on one face (e.g., a front cover) of the body 4 of the image forming apparatus 1. The arms 201 and 202 movably support the control panel 2. As illustrated in FIG. 1, the arms 201 and 202 support the control panel 2 perpendicularly or parallel to an installation face of the image forming apparatus 1 where the image forming apparatus 1 is placed, a scanning face 102a of the scanner unit 102 where the scanner unit 102 scans an image on an original, or a front face 109 (e.g., a front cover) serving as one face of the body 4 of the image forming apparatus 1.

Figure 6:
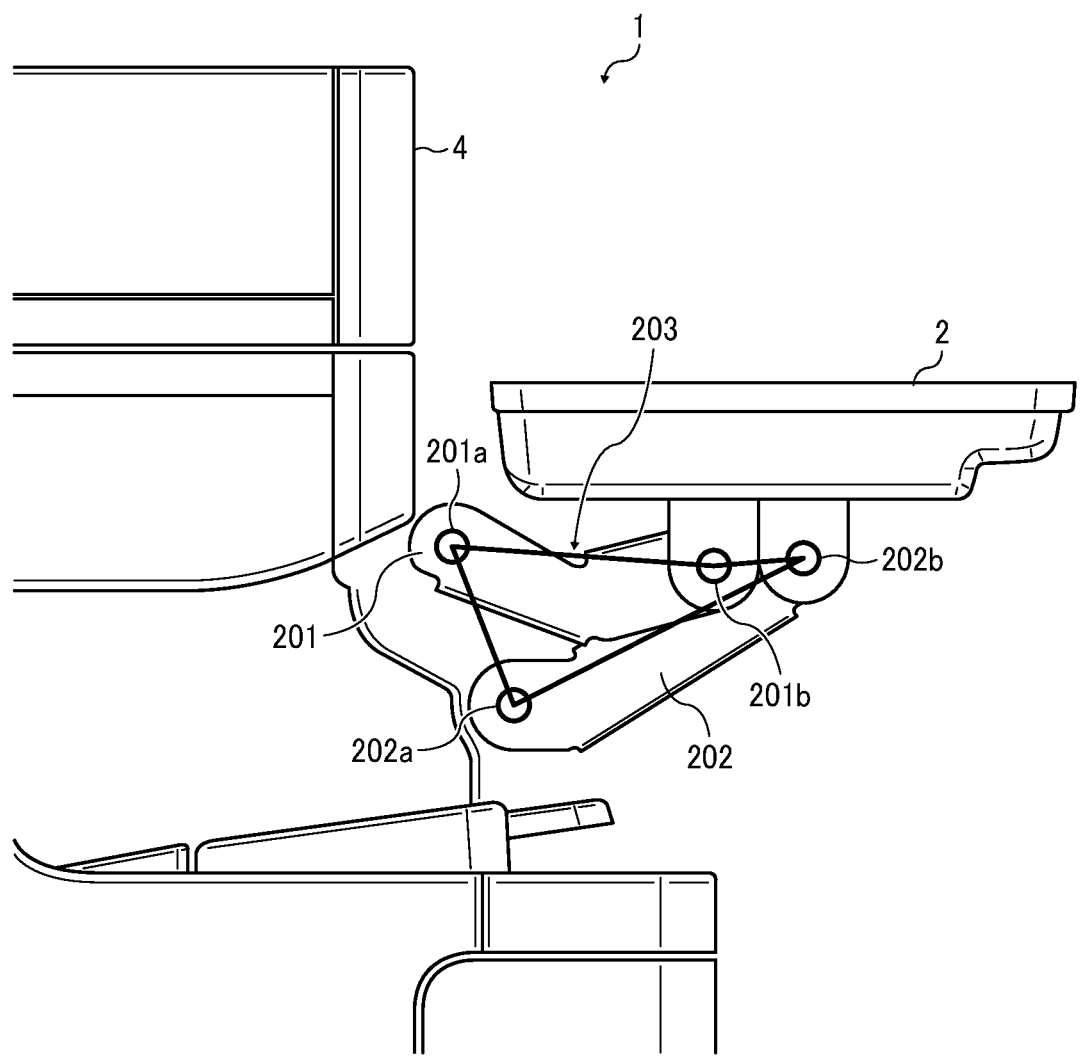
FIG. 6 is a partial side view of the image forming apparatus depicted in FIG. 4, illustrating a four bar linkage incorporated therein.

As illustrated in FIGS. 4 and 5, the arm 201 is provided with a rotation shaft 201a serving as a first rotation shaft that has a coupling point to be coupled with and secured to the body 4 of the image forming apparatus 1. The arm 202 is provided with a rotation shaft 202a serving as a second rotation shaft that has a coupling point to be coupled with and secured to the body 4 of the image forming apparatus 1. The arm 201 is further provided with a rotation shaft 201b serving as a third rotation shaft that has a coupling point to be coupled with and secured to the control panel 2. The arm 202 is further provided with a rotation shaft 202b serving as a fourth rotation shaft that has a coupling point to be coupled with and secured to the control panel 2. As illustrated in FIG. 6, as the arms 201 and 202 pivot, the rotation shafts 201a, 202a, 201b, and 202b are interlocked with the arms 201 and 202, constructing a four bar linkage 203 serving as a linkage. FIG. 6 is a partial side view of the image forming apparatus 1, illustrating the four bar linkage 203.

As the arms 201 and 202 pivot, the rotation shafts 201a and 202a activate the four bar linkage 203 in a state in which the rotation shaft 201a does not overlap the rotation shaft 202a. Similarly, as the arms 201 and 202 pivot, the rotation shafts 201b and 202b activate the four bar linkage 203 in a state in which the rotation shaft 201b does not overlap the rotation shaft 202b.

Since the control panel 2 according to this embodiment has an increased size defined by a vertical length of about 150 mm and a horizontal length of about 250 mm, the control panel 2 displays letters in large sizes and information of an increased volume at one time. Accordingly, the control panel 2 improves usability for the user of the image forming apparatus 1. However, if the large control panel 2 is disposed in parallel to the front face 109 depicted in FIG. 1, the control panel 2 may partially overlap or block the opening 3 defined by the output tray 107, obstructing the user from picking up the sheet from the output tray 107 easily. In order to facilitate picking up of the sheet by the user, the control panel 2 is requested not to block the opening 3 defined by the output tray 107.

Figure 7:
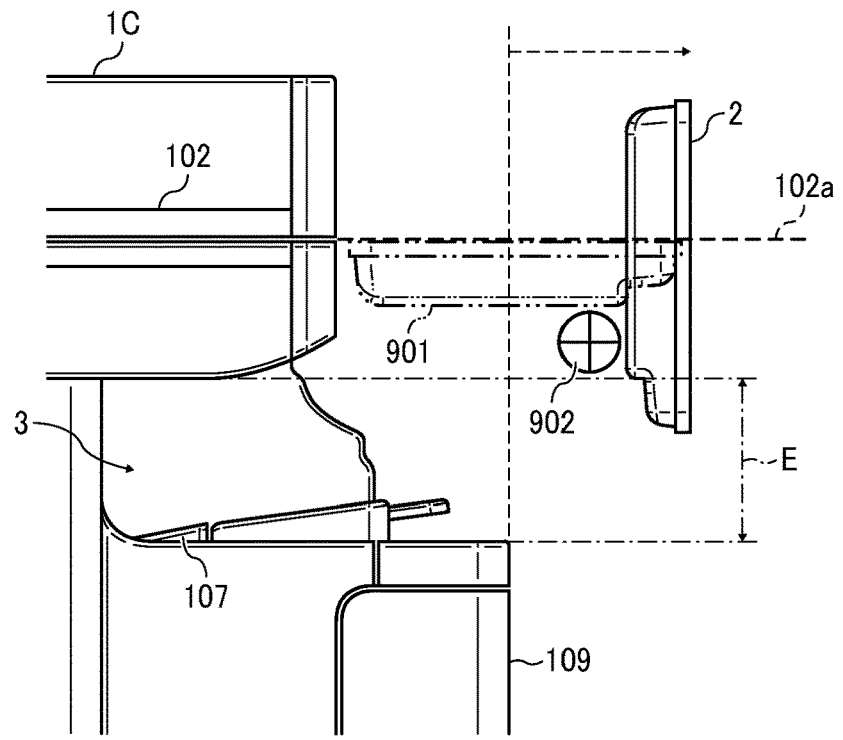
FIG. 7 is a partial side view of a comparative image forming apparatus.

FIG. 7 is a partial side view of a comparative image forming apparatus 1C incorporating an arm 901 supporting the control panel 2 and being pivoted about a single rotation shaft 902. As illustrated in FIG. 7, if the control panel 2 is placed such that the control panel 2 does not block or overlap the opening 3 defined by the output tray 107 and does not project upward beyond the scanning face 102a of the scanner unit 102, the control panel 2 may project horizontally beyond the front face 109 of the comparative image forming apparatus 1C with an increased length.

Figure 8:
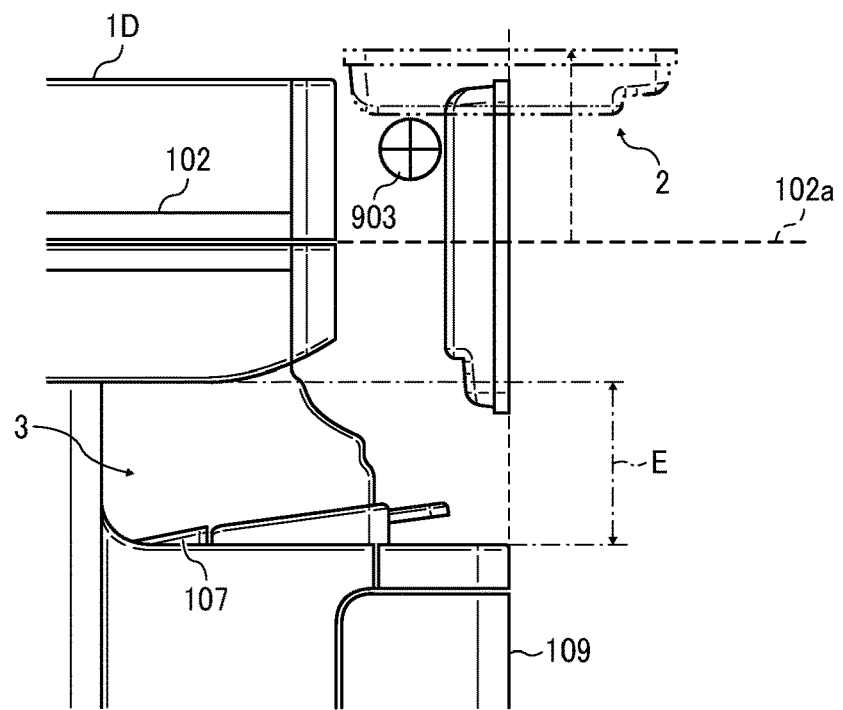
FIG. 8 is a partial side view of another comparative image forming apparatus.

FIG. 8 is a partial side view of a comparative image forming apparatus 1D incorporating the control panel 2 being pivoted about a rotation shaft 903. As illustrated in FIG. 8, if the control panel 2 is placed such that the control panel 2 does not project horizontally beyond the front face 109 of the comparative image forming apparatus 1D, the control panel 2 may project upward beyond the scanning face 102a.

As illustrated in FIG. 7, if the control panel 2 projects horizontally beyond the front face 109, the control panel 2 may produce a work space, where the user operates the control panel 2, which is outside an installation space where the body 4 of the comparative image forming apparatus 1C is located. Hence, the work space produced by the control panel 2 may require an operation space of the comparative image forming apparatus 1C that is greater than the installation space thereof. As illustrated in FIG. 8, if the control panel 2 projects upward beyond the scanning face 102a of the comparative image forming apparatus 1D, a part of an original that protrudes from the scanner unit 102 may come into contact with the control panel 2, for example, lifting the original from the scanning face 102a partially.

Figure 9:
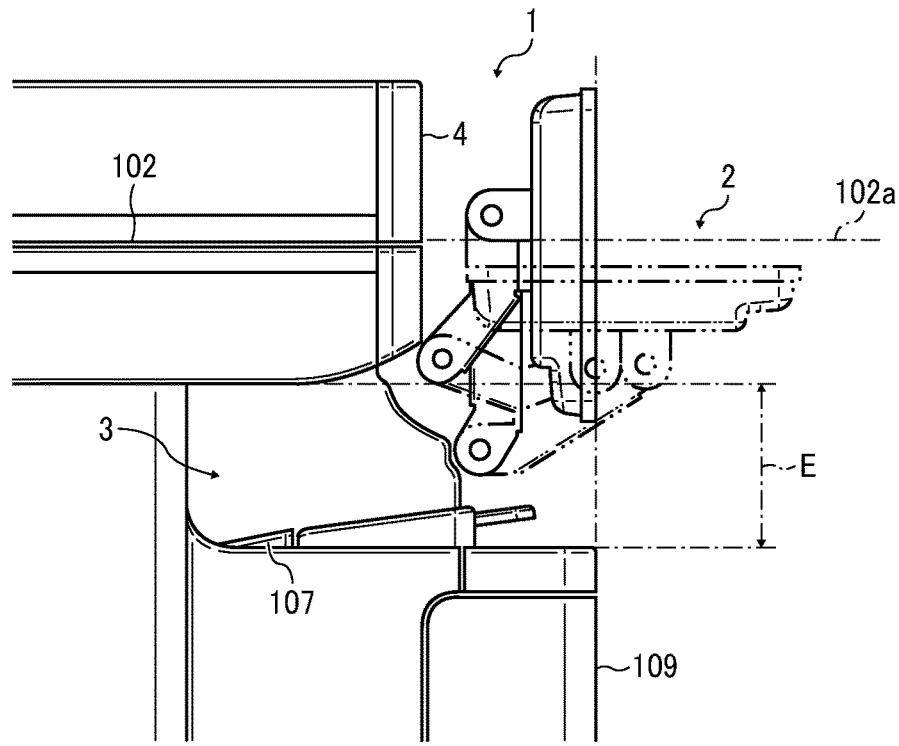
FIG. 9 is a partial side view of the image forming apparatus depicted in FIG. 4, illustrating positioning of the control panel.

FIG. 9 is a partial side view of the image forming apparatus 1, illustrating positioning of the control panel 2 according to this embodiment. As illustrated in FIG. 9, when the control panel 2 is placed perpendicularly to the front face 109, the arms 201 and 202 depicted in FIGS. 4 to 6 prevent the control panel 2 from entering the opening 3 defined by the output tray 107. That is, the arms 201 and 202 prevent the control panel 2 from being placed in a sheet ejection region E defined by the output tray 107, through which the user picks up the sheet ejected onto the output tray 107. When the control panel 2 is placed parallel to the front face 109, the control panel 2 does not project horizontally beyond the front face 109 to an outside of the body 4 of the image forming apparatus 1.

When the control panel 2 is placed parallel to the front face 109 as indicated in a solid line in FIG. 9, a display (e.g., the touch panel) of the control panel 2 is aligned with the front face 109 vertically or is disposed closer to the scanner unit 102 than the front face 109 is. Accordingly, the user operates the control panel 2 within the installation space of the body 4 of the image forming apparatus 1.

When the control panel 2 is placed perpendicularly to the front face 109 as indicated in a dotted line in FIG. 9, the display (e.g., the touch panel) of the control panel 2 is aligned with the scanning face 102a of the scanner unit 102 horizontally or is disposed below the scanning face 102a of the scanner unit 102. Accordingly, even if the original overlaps the control panel 2, the control panel 2 does not lift the original from the scanning face 102a of the scanner unit 102, allowing proper printing.

Figure 10:
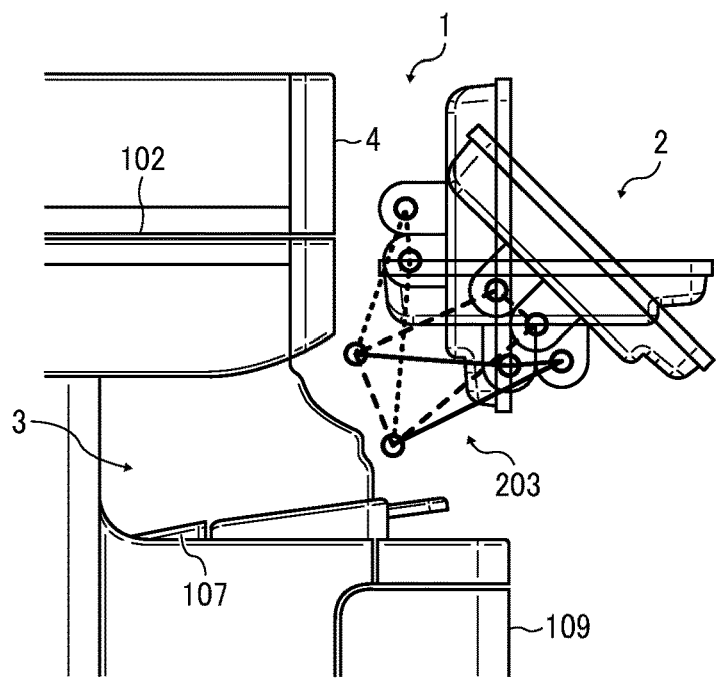
FIG. 10 is a partial side view of the image forming apparatus depicted in FIG. 6, illustrating motion of rotation shafts of the four bar linkage.

FIG. 9 illustrates the sheet ejection region E defined by the opening 3 produced by the output tray 107. As illustrated in FIG. 10, as the user moves the control panel 2, the arms 201 and 202 depicted in FIG. 6 pivot and the rotation shafts 201a, 202a, 201b, and 202b interlocked with each other move in accordance with movement of the arms 201 and 202 without moving separately. FIG. 10 is a partial side view of the image forming apparatus 1, illustrating motion of the rotation shafts 201b and 202b while the rotation shafts 201a and 202a are stationary when the control panel 2 moves from a position where the control panel 2 is parallel to a horizontal plane parallel to a ground to a position where the control panel 2 is angled relative to the horizontal plane by 45 degrees and a position where the control panel 2 is angled relative to the horizontal plane by 90 degrees.

Accordingly, the four bar linkage 203 prevents accidental motion of the control panel 2 without an extra mechanism that supports the control panel 2 and adjusts the angle of the control panel 2. The four bar linkage 203 adjusts a relative position of the rotation shafts 201a, 202a, 201b, and 202b and pivots the arms 201 and 202. Accordingly, the four bar linkage 203 restricts motion of the control panel 2 according to the size of the control panel 2 such that the control panel 2 does not enter the opening 3 defined by the output tray 107 and does not protrude beyond the front face 109 of the body 4 of the image forming apparatus 1.

Each of the rotation shafts 201a, 202a, 201b, and 202b is mounted with a frictional resistance applicator such as a disc spring, a washer, and a nut. The frictional resistance applicator retains the control panel 2 at an arbitrary position on a trajectory on which the arms 201 and 202 pivot. In this case, an amount of motion or an angular velocity of the rotation shafts 201a, 202a, 201b, and 202b varies depending on the position of the control panel 2.

A description is provided of dimension of the four bar linkage 203.

Figure 11:
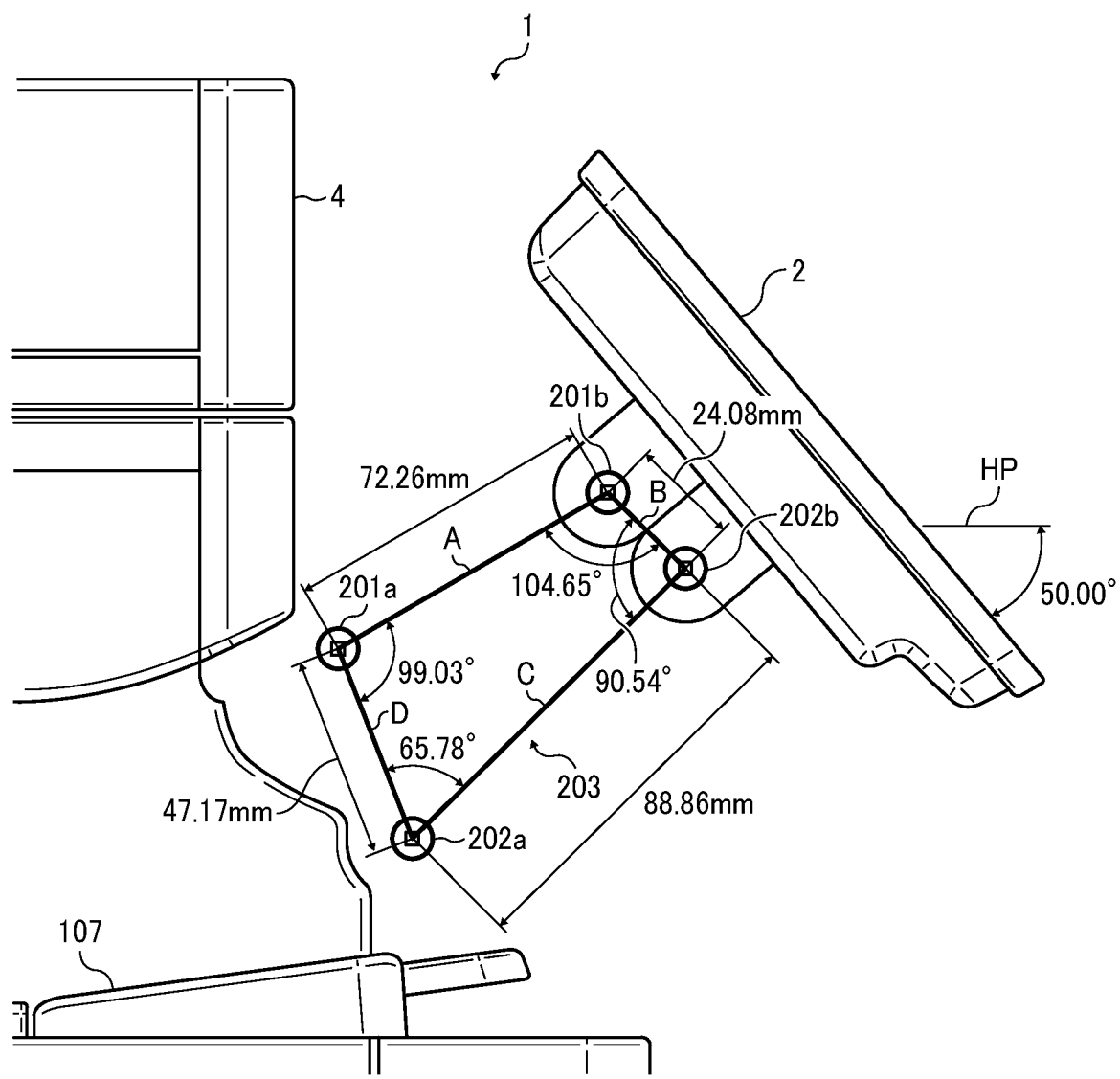
FIG. 11 is a partial side view of the image forming apparatus depicted in FIG. 10, illustrating the rotation shafts of the four bar linkage.

FIG. 11 is a partial side view of the image forming apparatus 1, illustrating the four bar linkage 203. As illustrated in FIG. 11, the four bar linkage 203 has sides A, B, C, and D. A length of the side A, that is, a distance between the rotation shafts 201a and 201b, is 72.26 mm. A length of the side B, that is, a distance between the rotation shafts 201b and 202b, is 24.08 mm. A length of the side C, that is, a distance between the rotation shafts 202b and 202a, is 88.86 mm. A length of the side D, that is, a distance between the rotation shafts 202a and 201a, is 47.17 mm. The length of each of the sides A, B, C, and D is based on a central axis of each of the rotation shafts 201a, 201b, 202a, and 202b. Each of the sides A, B, C, and D is a straight line defined by the corresponding rotation shafts 201a, 201b, 202a, and 202b. FIG. 11 omits the arms 201 and 202.

As illustrated in FIG. 11, an operation face of the control panel 2, which mounts the touch panel and the keyboard, is tilted relative to a horizontal plane HP by 50 degrees. An angle Arm1OP formed by the sides A and B is 104.65 degrees. An angle Arm2OP formed by the sides B and C is 90.54 degrees. An angle Arm2BS formed by the sides C and D is 65.78 degrees. An angle Arm1BS formed by the sides D and A is 99.03 degrees.

Figure 13:
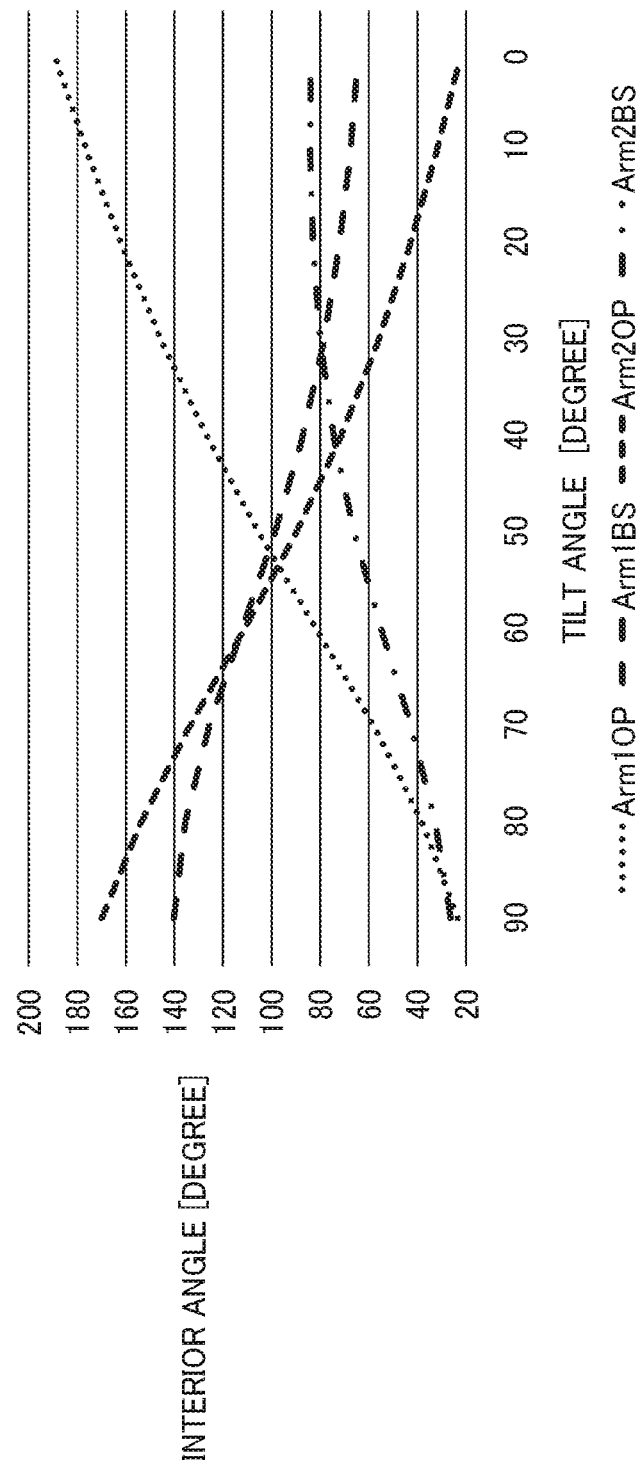
FIG. 13 is a graph illustrating the relation between the tilt angle of the control panel and the interior angle formed by the rotation shafts depicted in FIG. 11.

FIG. 12 is a lookup table illustrating a relation between a tilt angle of the control panel 2 at which the control panel 2 is tilted relative to the horizontal plane HP and an interior angle (e.g., the angles Arm1OP, Arm1BS, Arm2OP, and Arm2BS) formed by the rotation shafts 201b, 201a, 202b, and 202a. The tilt angle of the control panel 2 changes every 10 degrees. FIG. 13 is a graph illustrating the relation between the tilt angle of the control panel 2 and the interior angle formed by the rotation shafts 201b, 201a, 202b, and 202a. The graph illustrated in FIG. 13 is produced based on the lookup table depicted in FIG. 12. In FIG. 13, a vertical axis represents the interior angle (e.g., the angles Arm1OP, Arm1BS, Arm2OP, and Arm2BS). A horizontal axis represents the tilt angle of the control panel 2 relative to the horizontal plane HP.

Figure 15:
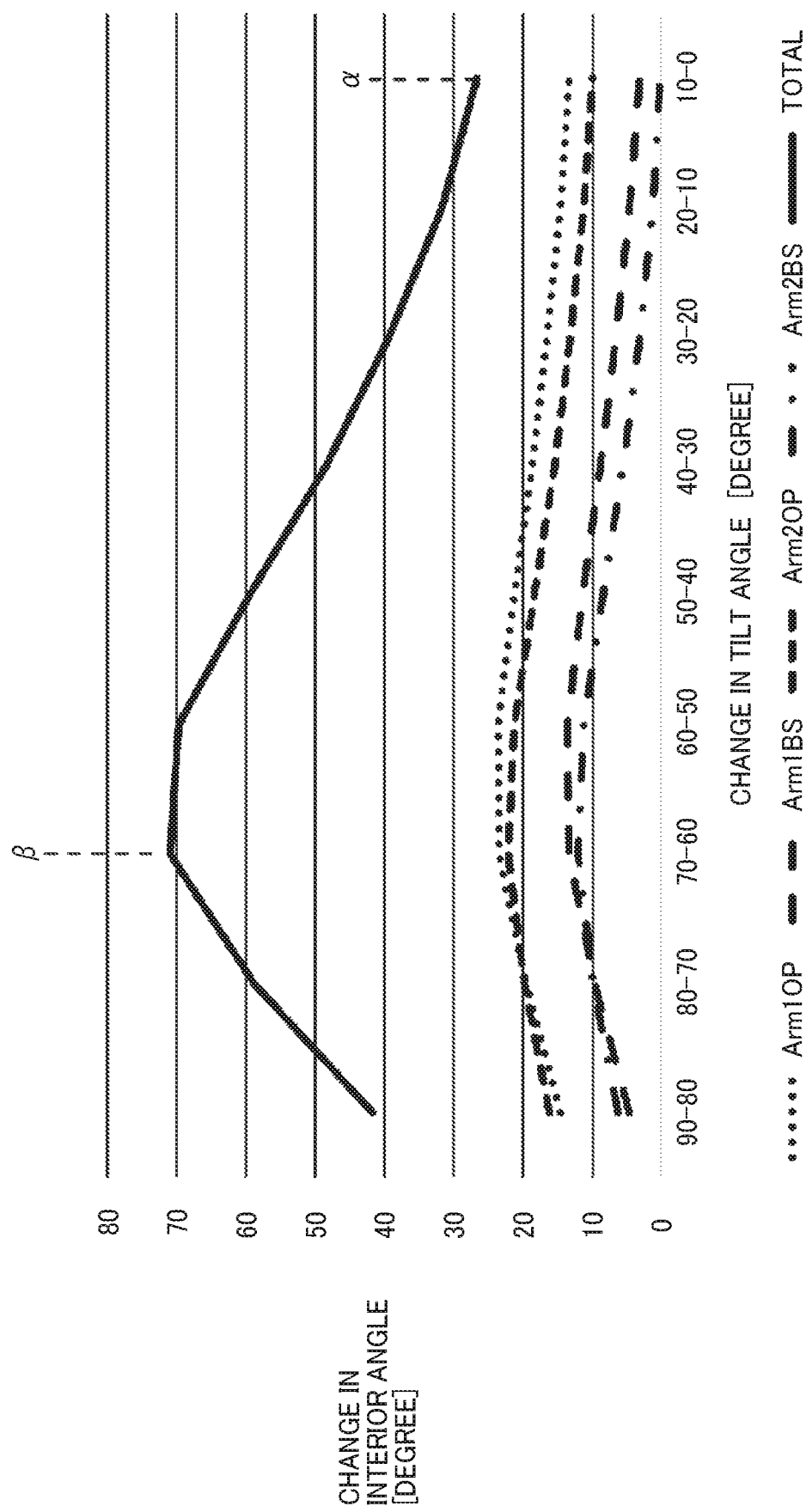
FIG. 15 is a graph illustrating the relation between change in the tilt angle of the control panel and change in the interior angle formed by the rotation shafts depicted in FIG. 11.

FIG. 14 is a lookup table illustrating a relation between change of 10 degrees in the tilt angle of the control panel 2 at which the control panel 2 is tilted relative to the horizontal plane HP and the interior angle (e.g., the angles Arm1OP, Arm1BS, Arm2OP, and Arm2BS) formed by the rotation shafts 201b, 201a, 202b, and 202a of the four bar linkage 203. FIG. 15 is a graph illustrating the relation between change in the tilt angle of the control panel 2 and change in the interior angle formed by the rotation shafts 201b, 201a, 202b, and 202a. The graph illustrated in FIG. 15 is produced based on the lookup table depicted in FIG. 14. In FIG. 15, a vertical axis represents the amount of change in the interior angle (e.g., the angles Arm1OP, Arm1BS, Arm2OP, and Arm2BS) of the four bar linkage 203. A horizontal axis represents change in the tilt angle of the control panel 2 relative to the horizontal plane HP.

As illustrated in FIG. 14, when the tilt angle of the control panel 2 relative to the horizontal plane HP changes from 0 degree to 10 degrees at a point α depicted in FIG. 15, a total amount of change in the interior angles (e.g., the angles Arm1OP, Arm1BS, Arm2OP, and Arm2BS) of the four bar linkage 203 is 26.66 degrees. When the tilt angle of the control panel 2 relative to the horizontal plane HP changes from 60 degrees to 70 degrees at a point β depicted in FIG. 15, a total amount of change in the interior angles (e.g., the angles Arm1OP, Arm1BS, Arm2OP, and Arm2BS) of the four bar linkage 203 is 70.96 degrees.

Accordingly, when the tilt angle of the control panel 2 relative to the horizontal plane HP changes from 60 degrees to 70 degrees, the total amount of change in the interior angles of the four bar linkage 203 is greater than that when the tilt angle of the control panel 2 relative to the horizontal plane HP changes from 0 degree to 10 degrees, thus increasing an amount of motion of the four bar linkage 203. Consequently, when the user changes the tilt angle of the control panel 2 relative to the horizontal plane HP from 60 degrees to 70 degrees, the user senses an increased frictional resistance against motion of the control panel 2.

As illustrated in FIG. 15, when the user changes the tilt angle of the control panel 2 relative to the horizontal plane HP from 60 degrees to 70 degrees, the total amount of change in the interior angles of the four bar linkage 203 is greatest. Therefore, the user senses a greatest frictional resistance against motion of the control panel 2. The above describes change in the interior angle of the four bar linkage 203 when the user changes the tilt angle of the control panel 2 from 0 degree to 10 degrees and from 60 degrees to 70 degrees. Similarly, the interior angles of the four bar linkage 203 change reversely when the user changes the tilt angle of the control panel 2 from 10 degrees to 0 degree and from 70 degrees to 60 degrees.

Figure 16:
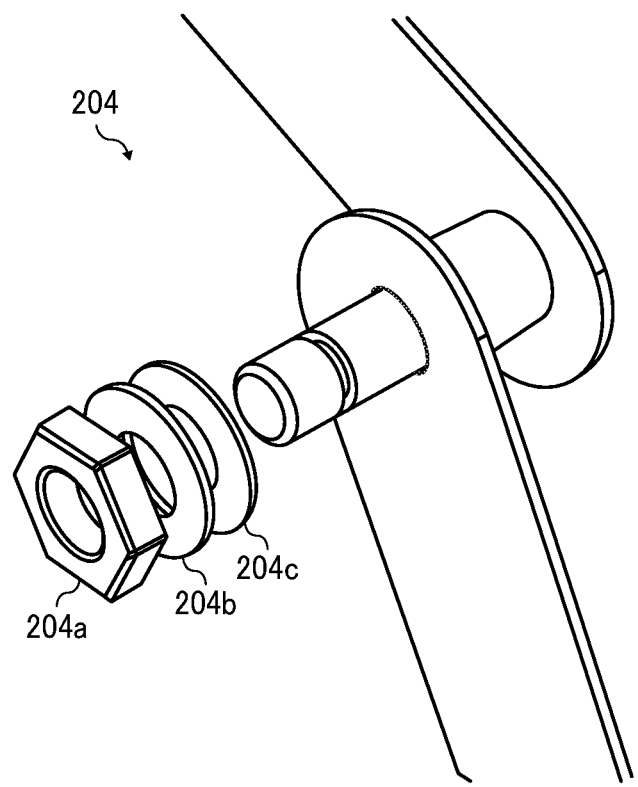
FIG. 16 is a perspective view of a comparative frictional resistance applicator.

As described above, in order to eliminate change in frictional resistance that occurs as the user moves the control panel 2, the image forming apparatus 1 according to this embodiment incorporates the frictional resistance applicator that changes the frictional resistance according to the interior angles formed by the rotation shafts 201a, 202a, 201b, and 202b. FIG. 16 is a perspective view of a comparative frictional resistance applicator. As illustrated in FIG. 16, a spring washer 204 serving as the comparative friction resistance applicator includes a nut 204a and washers 204b and 204c. Since each of the washers 204b and 204c is planar, the frictional resistance is uniform at any angle.

Figure 17:
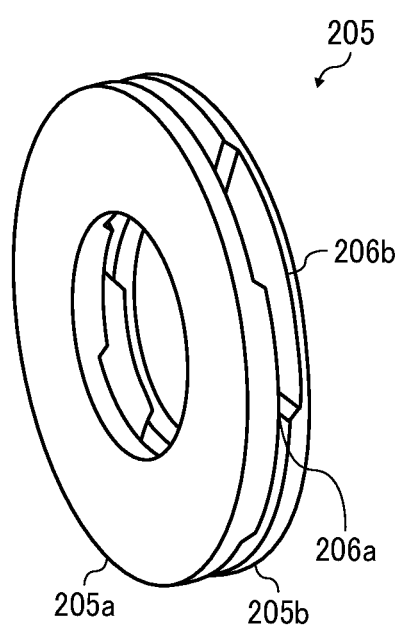
FIG. 17 is a perspective view of a spring washer mounted on each of the rotation shafts depicted in FIG. 11.
Figure 18A:
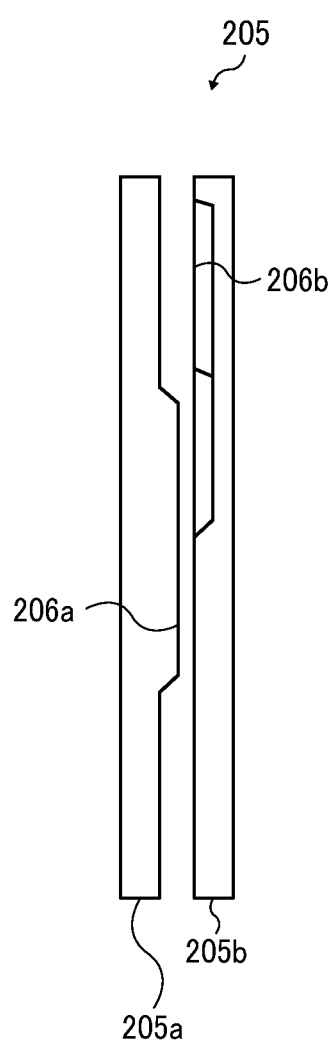
FIG. 18A is a side view of the spring washer depicted in FIG. 17 at a rotation angle.
Figure 18B:
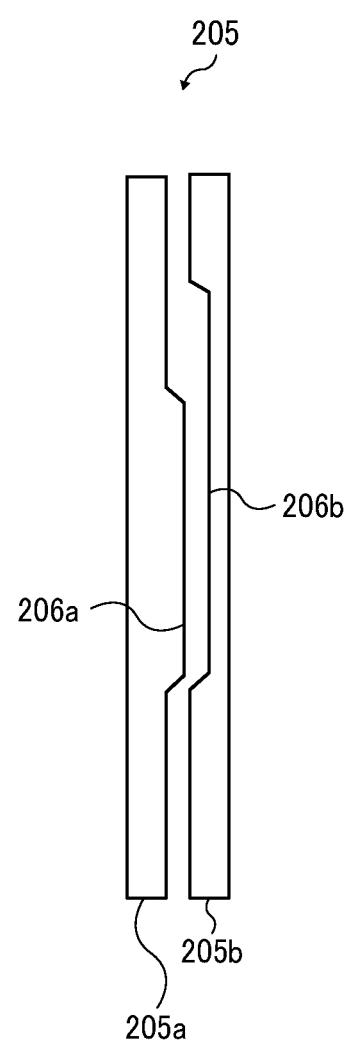
FIG. 18B is a side view of the spring washer depicted in FIG. 17 at another rotation angle.

Referring to FIGS. 17, 18A, and 18B, a description is provided of a construction of a spring washer 205 serving as a frictional resistance applicator according to this embodiment.

FIG. 17 is a perspective view of the spring washer 205. FIG. 18A is a side view of the spring washer 205 at a rotation angle. FIG. 18B is a side view of the spring washer 205 at another rotation angle. As illustrated in FIGS. 17, 18A, and 18B, the spring washer 205 is irregular and includes a projection 206a and a recess 206b, thus changing the frictional resistance applied to the spring washer 205. The spring washer 205 is constructed of two spring washers 205a and 205b. The spring washers 205a and 205b may be incorporated into the spring washer 204 depicted in FIG. 16 or may be replaced with the washers 204b and 204c.

With the dimension of the arms 201 and 202 that is defined by the rotation shafts 201a, 201b, 202b, and 202a depicted in FIG. 11, when the user moves the control panel 2 to change the tilt angle thereof relative to the horizontal plane HP from 10 degrees to 70 degrees, an amount of motion of the four bar linkage 203 increases and therefore the frictional resistance against motion of the control panel 2 increases. Conversely, the spring washer 205 depicted in FIGS. 17, 18A, and 18B decreases the frictional resistance applied to the rotation shafts 201a, 202a, 201b, and 202b as the tilt angle of the control panel 2 relative to the horizontal plane HP changes from 10 degrees to 70 degrees.

The spring washer 205 depicted in FIGS. 17, 18A, and 18B is mounted on each of the rotation shafts 201a, 202a, 201b, and 202b, retaining a constant friction resistance applied to the rotation shafts 201a, 202a, 201b, and 202b regardless of the tilt angle of the control panel 2.

As illustrated in FIG. 17, the spring washer 205a includes the projection 206a. The spring washer 205b includes the recess 206b to engage the projection 206a at a predetermined angle. Predetermined pressure is exerted to the spring washer 205a rightward in FIGS. 18A and 18B. Accordingly, as the rotation shafts 201a, 202a, 201b, and 202b rotate, a relative position of the spring washer 205a to the spring washer 205b changes, thus changing an engagement position of the recess 206b that engages the projection 206a.

When the recess 206b does not engage the projection 206a as illustrated in FIG. 18A, the frictional resistance against motion of the control panel 2 increases. Conversely, as the rotation shafts 201a, 202a, 201b, and 202b rotate and the recess 206b engages the projection 206a as illustrated in FIG. 18B, the friction resistance against motion of the control panel 2 decreases.

At the position β depicted in FIG. 15, the amount of change in the interior angle of the four bar linkage 203 is great and the frictional resistance against motion of the control panel 2 is also great. Hence, when the user moves the control panel 2, the user feels that the control panel 2 is heavy. To address this circumstance and decrease the frictional resistance against motion of the control panel 2, the spring washer 205a engages the spring washer 205b as illustrated in FIG. 18B.

Conversely, at the position α depicted in FIG. 15, the amount of change in the interior angle of the four bar linkage 203 is small and the frictional resistance against motion of the control panel 2 is also small. Hence, when the user moves the control panel 2, the user feels that the control panel 2 is light. To address this circumstance and increase the frictional resistance against motion of the control panel 2, the spring washer 205a does not engage the spring washer 205b as illustrated in FIG. 18A. As described above, the spring washer 205 changes the frictional resistance applied thereto according to the engagement position of the projection 206a with the recess 206b, thus exerting constant pressure to the control panel 2, that moves the control panel 2.

As described above, according to the embodiments of the present disclosure, the position of the control panel 2 may be adjusted within a movement range in which the control panel 2 does not disturb picking up of the sheet ejected into the opening 3 from the output tray 107 and usage of the scanner unit 102. Additionally, the control panel 2 may move without projecting outward beyond the body 4 of the image forming apparatus 1, minimizing the installation space occupied by the image forming apparatus 1.

The control panel 2 may be incorporated in the image forming apparatus 1 employing an electrophotographic printing system or an image forming apparatus employing an inkjet printing system. The arm 201 is curved at a predetermined angle. Accordingly, the arm 201 does not come into contact with a lower portion of the control panel 2 and does not damage the control panel 2.

A description is provided of advantages of an image forming apparatus (e.g., the image forming apparatus 1).

As illustrated in FIGS. 1 and 4 to 6, the image forming apparatus includes an operation display (e.g., the control panel 2), a first arm (e.g., the arm 201), a second arm (e.g., the arm 202), a first rotation shaft (e.g., the rotation shaft 201a), a second rotation shaft (e.g., the rotation shaft 202a), a third rotation shaft (e.g., the rotation shaft 201b), a fourth rotation shaft (e.g., the rotation shaft 202b), a linkage (e.g., the four bar linkage 203), and a scanner (e.g., the scanner unit 102).

The operation display receives an instruction to operate the image forming apparatus. The first arm couples a part of one face, that is, a mount face (e.g., the front face 109), of a body (e.g., the body 4) of the image forming apparatus with a part of the operation display. The second arm couples another part of the one face of the body of the image forming apparatus with another part of the operation display. The first rotation shaft is mounted on the first arm and has a coupling point coupled with the body of the image forming apparatus. The second rotation shaft is mounted on the second arm and has a coupling point coupled with the body of the image forming apparatus. The third rotation shaft is mounted on the first arm and has a coupling point coupled with the operation display. The fourth rotation shaft is mounted on the second arm and has a coupling point coupled with the operation display. The linkage (e.g., the four bar linkage 203) includes the first rotation shaft, the second rotation shaft, the third rotation shaft, the fourth rotation shaft, the first arm, and the second arm.

The linkage defines a movement range of the operation display. The movement range is a range where the operation display does not enter an opening (e.g., the opening 3) disposed inside the body of the image forming apparatus. The opening receives a recording medium ejected into the opening. As illustrated in FIG. 9, in the movement range, the operation display does not protrude outward beyond the one face of the body of the image forming apparatus when the first arm and the second arm support the operation display perpendicularly to an installation face of the image forming apparatus where the image forming apparatus is placed. Additionally, in the movement range, the operation display does not protrude upward beyond the scanner disposed above the opening when the first arm and the second arm support the operation display parallel to the installation face of the image forming apparatus.

Thus, the image forming apparatus incorporating the movable operation display saves space without degrading usability of a user of the image forming apparatus.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present invention.

Any one of the above-described operations may be performed in various other ways, for example, in an order different from the one described above.

What is claimed is:
1. An image forming apparatus comprising:
a body;
an operation display configured to receive an operation input for executing an operation of the image forming apparatus; and
a linkage defining a movement range of the operation display, the linkage including,
  a first arm linking a part of the body with a part of the operation display,
  a second arm linking another part of the body with another part of the operation display,
  a first shaft linking the part of the body with the first arm, the first arm being rotatable around the first shaft with respect to the part of the body,
  a second shaft linking the part of the operation display with the first arm, the operation display being rotatable around the second shaft with respect to the first arm,
  a third shaft linking said another part of the body with the second arm, the second arm being rotatable around the third shaft with respect to said another part of the body,
  a fourth shaft linking the second arm with said another part of the operation display, the operation display being rotatable around the fourth shaft with respect to the second arm, and
a plurality of resistance applicators including two or more of,
  a first resistance applicator between the first arm and the part of the body, the first resistance applicator having a resistance thereof that varies with a change in a first angle formed by the part of the body and the first arm;
  a second resistance applicator between the first arm and the part of the operation display, the second resistance applicator having a resistance thereof that varies with a change in a second angle formed by the first arm and the operation display;

a third resistance applicator between the second arm and said another part of the body, the third resistance applicator having a resistance thereof that varies with a change in a third angle formed by said another part of the body and the second arm; and a fourth resistance applicator between the second arm and said another part of the operation display, the fourth resistance applicator having a resistance thereof that varies with a change in a fourth angle formed by the second arm and the operation display, wherein a resistance of the plurality of resistance applicators is variable such that the resistance of the plurality of resistance applicators decreases with an increase in a total amount of change of the first angle, the second angle, the third angle, and the fourth angle as the operation display tilts.

2. The image forming apparatus according to claim 1, further comprising:

a scanner above an opening inside the body, into which a recording medium is ejected; and an internal ejection portion inside the body and defining an opening into which a recording medium is ejected, wherein the movement range of the operation display is a range in which the operation display does not enter a region to which the recording medium is ejected in the opening, does not protrude outward beyond a side face of the body, and does not protrude upward beyond the scanner.

3. The image forming apparatus according to claim 2, wherein the plurality of resistance applicators includes a pair of washers, wherein the plurality of resistance applicators each is a frictional resistance applicator in which one washer of the pair of washers has a projection and a other washer of the pair of washers has a recess.

4. The image forming apparatus according to claim 2, wherein the first resistance applicator is engaged with the first shaft, the second resistance applicator is engaged with the second shaft, the third resistance applicator is engaged with the third shaft, and the fourth resistance applicator is engaged with the fourth shaft.

5. The image forming apparatus according to claim 1, further comprising:

a linked portion of the first arm and the part of the body and a linked portion of the second arm and said another part of the body are at different positions in a horizontal direction of the image forming apparatus.

6. The image forming apparatus according to claim 5, wherein the first arm is shaped to have an angle so that the first arm does not contact the operation display when the operation display is horizontally supported relative to an installation face on which the image forming apparatus is placed.

7. The image forming apparatus according to claim 1, wherein the plurality of resistance applicators each include a projection and a recess, the plurality of resistance applicators configured to decrease a frictional resistance applied to a respective shaft of the first shaft, the second shaft the third shaft and the fourth shaft in response to the recess engaging the projection when an interior angle formed by the respective shaft reaches a predetermined angle.

8. The image forming apparatus according to claim 1, wherein as the operation display tilts, the operation display is configured to lock within each of a plurality of intervals of tilt angles of the operation display defined by the first angle, the second angle, the third angle and the fourth angle.

9. A mount comprising:

a pair of arms configured to secure an operation display to an apparatus, the pair of arms each including, a first end and a second end with first rotational shafts at the first end of respective ones of the pair of arms and second rotational shafts at the second end of the respective ones of the pair of arms, the first end of the respective ones of the pair of arms configured to mount to a body of the apparatus with a first distance therebetween and the second end of the respective ones of the pair of arms configured to mount to the operation display with a second distance therebetween such that the first distance between the first rotational shafts at the body of the apparatus is greater than the second distance between the second rotational shafts at the operation display, and a plurality of resistance applicators on at least one shaft of the first rotational shafts and the second rotational shafts, the plurality of resistance applicators configured to apply a resistance to the at least one shaft that varies with a change in angles formed by the operation display and the respective ones of the pair of arms, wherein a resistance of the plurality of resistance applicators is variable such that the resistance of the plurality of resistance applicators decreases with an increase in a total amount of change of each of the angles formed by the operation display and the respective ones of the pair of arms as the operation display tilts.

10. The mount of claim 9, wherein the pair of arms are connected in a four-bar linkage structure and the first distance and the second distance between the pair of arms is set such that a movement range of the operation display does not enter an internal sheet ejection tray, does not protrude outward beyond the body when linkage supports the operation display perpendicularly to the apparatus, and does not protrude upward beyond a scanner when the linkage supports the operation display parallel to the apparatus.

11. The mount of claim 9, wherein the plurality of resistance applicators includes a projection and a recess, the plurality of resistance applicators configured to decrease a frictional resistance applied to the at least one shaft in response to the recess engaging the projection when an interior angle formed by the at least one shaft reaches a predetermined angle.

12. The mount according to claim 9, wherein as the operation display tilts, the operation display is configured to lock within each of a plurality of intervals of tilt angles of the operation display defined by the angles formed by the operation display and the respective ones of the pair of arms.

* * * * *